United States Patent [19]

Kazama et al.

[11] Patent Number: 5,545,316

[45] Date of Patent: Aug. 13, 1996

[54] APPARATUS FOR TREATING WATER CONTAINING ORGANIC CHLORINE COMPOUNDS

[75] Inventors: Masahiro Kazama; Shigekazu Haginoya, both of Tokyo, Japan

[73] Assignee: NEC Environment Engineering Ltd., Tokyo, Japan

[21] Appl. No.: 491,452

[22] Filed: Jun. 16, 1995

Related U.S. Application Data

[62] Division of Ser. No. 226,037, Apr. 11, 1994, Pat. No. 5,478,481.

[30] Foreign Application Priority Data

Sep. 21, 1993 [JP] Japan ................................. 5-234967

[51] Int. Cl.⁶ .............................. C02F 1/20; B01D 19/00
[52] U.S. Cl. .......................... 210/188; 210/205; 210/218; 210/220; 96/202
[58] Field of Search ............................... 210/198.1, 205, 210/220, 218, 188; 96/202; 95/263

[56] References Cited

U.S. PATENT DOCUMENTS

| | | | |
|---|---|---|---|
| 4,764,278 | 8/1988 | Chou et al. | 210/748 |
| 5,234,606 | 8/1993 | Kazama | 210/748 |
| 5,393,394 | 2/1995 | Ikeda et al. | 210/748 |

FOREIGN PATENT DOCUMENTS

| | | | |
|---|---|---|---|
| 218676 | 8/1989 | Japan | 210/748 |
| 7082 | 1/1992 | Japan | 210/748 |
| 90/14312 | 11/1990 | WIPO | 210/748 |

Primary Examiner—Neil McCarthy
Attorney, Agent, or Firm—Kanesaka & Takeuchi

[57] ABSTRACT

Raw water containing organic chlorine compounds is supplied in an aeration tank, wherein the organic chlorine compounds contained in the raw water are transferred into air or gas. The gas obtained from the aeration tank is collected in a treatment solution of a decomposition-treatment tank. The treatment solution contains an oxidizing agent and ultraviolet rays are irradiated to the treatment solution in the decomposition-treatment tank to activate the oxidizing agent, to thereby oxidization-decompose the organic chlorine compounds in the gas.

3 Claims, 4 Drawing Sheets

APPARATUS FOR TREATING WATER CONTAINING ORGANIC CHLORINE COMPOUNDS

CROSS-REFERENCE TO RELATED APPLICATION

This is a divisional application of patent application Ser. No. 08/226,037 filed on Apr. 11, 1994, now U.S. Pat. No. 5,478,481.

BACKGROUND OF THE INVENTION

1. Field of the Invention

The present invention relates to an apparatus of treating water polluted by organic chlorine compounds.

2. Description of the Prior Art

Recently, water in river and underground water have been polluted by various kinds of harmful substances and therefore, they are not suitable for drink or for industrial use unless they are treated. It is a matter of common knowledge that this is a serious social problem.

The main cause of polluting water in river and underground water is industrial drainage and wastewater to river. In addition to this industrial drainage, there is a case such that unexpected drainage and wastewater become a cause of polluting water in river and underground water. For example, a treatment solution used in dry cleaning contains tetrachloroethylene. When a waste liquid of dry cleaning is discharged into rivers without treatment, this becomes also a major cause of polluting water in river and underground water.

As technologies of treating tetrachloroethylene contained in a waste liquid, there has been conventionally known an adsorption method using activated carbon, an adsorption method using high molecular adsorption agent and a reduction treatment method using metallic irons. Among these methods, the adsorption method using activated carbon is an effective treatment method and it has been now employed.

However, in waste liquids, including industrial drainage and a waste liquid produced by the dry cleaning procedure and containing organic chlorine compounds such as tetrachloroethylene, other components used for the treatment, e.g., a surfactant, dirt or soil generated by the treatment, dyestuffs as well as components such as humic acids, fluvic acids, alcohols, ketones, etc. are contained together. Thus, when the activated carbon-adsorption method is used, the activated carbon is saturated immediately after the start of adsorption by the above-mentioned components, so that an effective treatment of organic chlorine compounds is not made.

In order to solve this problem, it was developed an ultraviolet-ray decomposition treatment, in which an oxidizing agent such as ozone, etc. is added in exhaust water and an ultra violet rays are irradiated to oxidation-decompose organic chlorine compounds. (Japanese Patent Application Laid-open No. Hei 4-7082)

Also, in U.S. Pat. No. 5,234,606, organic chlorine compounds are oxidation-decomposed by irradiation of ultraviolet rays onto oxidizing agent added before and remaining in water to be treated.

However, in the method according to the prior art, the treatment ability is affected by the permeating degree of ultraviolet rays into the waste liquid. When the waste liquid is made turbid by dyes, it is difficult to treat the waste liquid. Even though water to be treated is clear, when water contains an organic component such as a surfactant, the oxidation-decomposition of the organic chlorine compound of itself is inhibited and thus, sufficient treatment can not be conducted.

OBJECT AND SUMMARY OF THE INVENTION

An object of the invention is to provide a method which can treat organic chlorine compounds without inhibiting the activation of an oxidizing agent by an irradiation of ultraviolet rays even if raw water is a turbid liquid or solid materials and/or nonvolatile components are contained in raw water.

Another object of the invention is to provide a method which utilizes volatility of organic chlorine compounds such as tetrachloroethylene to collect the organic chlorine compound from the raw water, and to decompose the compounds.

A further object of the invention is to provide an apparatus for treating organic chlorine compounds in a liquid, which has a simple structure and can effectively remove chlorine compounds.

In the method of the invention, organic chlorine compounds contained in raw water is taken into a gas and collected in a treatment solution, and the organic chlorine compounds in the treatment solution are oxidation-decomposed by activating an oxidizing agent contained in the treatment solution. By irradiating ultraviolet rays in the treatment solution, oxidizing agents contained in the treatment solution is activated to decompose organic chlorine compounds collected in the treatment solution.

DETAILED DESCRIPTION OF THE PREFERRED EMBODIMENTS

Figure 1:
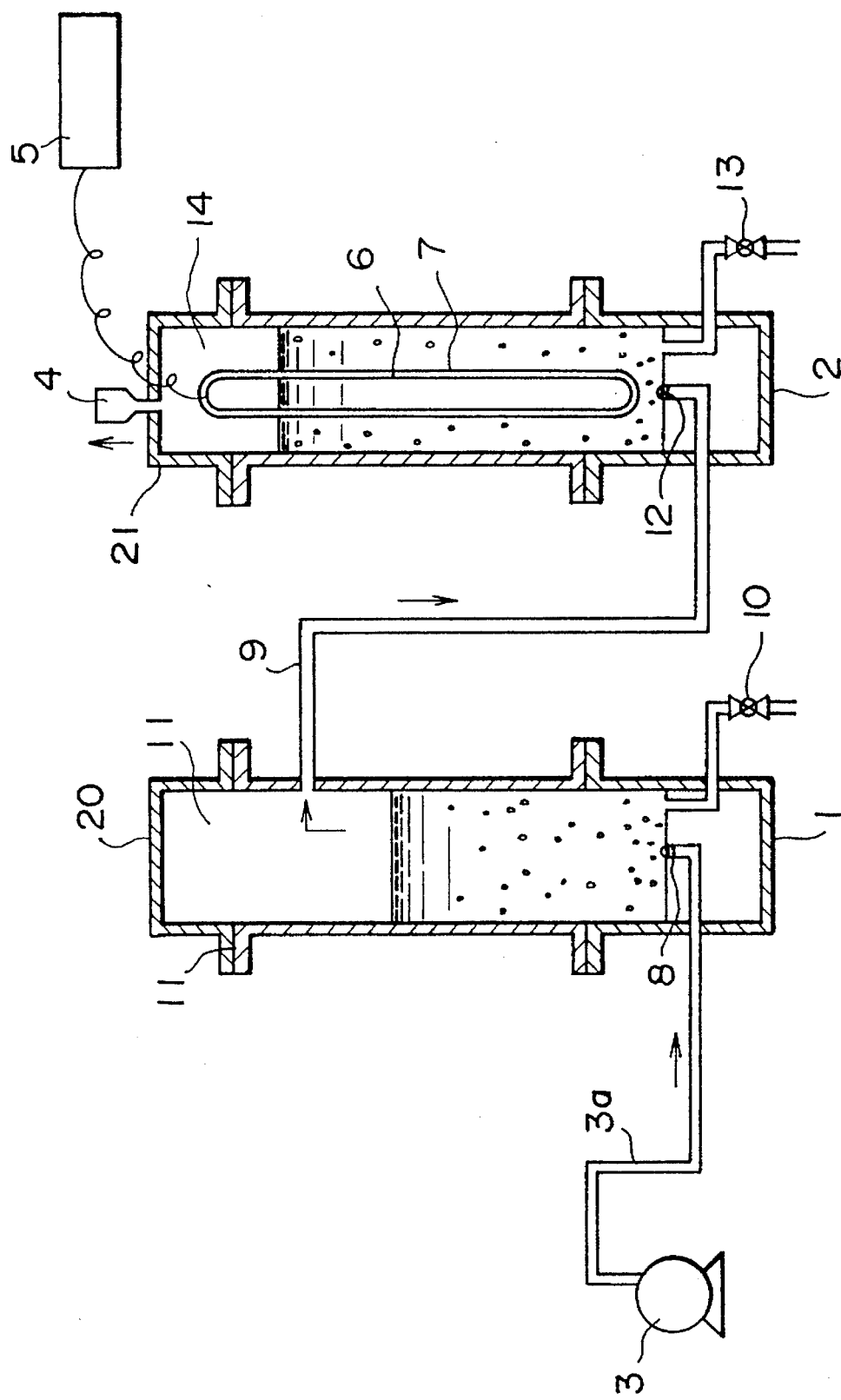
FIG. 1 is an explanatory view of an apparatus showing one of the examples according to the present invention.

The embodiments of the present invention are explained referring to the attached drawings. In FIG. 1, the present apparatus comprises an aeration tank 1 and a decomposition-treatment tank 2. The upper portion of the aeration tank 1 and the lower portion of the decomposition-treatment tank 2 are connected together through a pipe 9. The lower portion of the aeration tank 1 is connected to an air pump 3 through a pipe 3a.

In the aeration tank 1, raw water containing organic chlorine compounds is filled. In the decomposition-treatment tank 2, a treatment solution with an oxidizing agent is filled.

In the invention, air is supplied from the air pump 3 and is blown into raw water supplied in the aeration tank 1 from the lower portion thereof. The organic chlorine compounds in the raw water are caught from the raw water and taken into air.

As the material of the aeration tank 1 used in the present invention, either one of polyethylene, stainless steel and fluorine resin may be used, but polyethylene is preferable in consideration of costs and chemical resistance.

As the shape and structure of the aeration tank 1, it may be a container, which has an air diffuser pipe 8 connected to the air pump 8, at the bottom portion and the pipe 9 at the upper portion, through which air or gas taking organic chlorine compounds therein is transferred to the decomposition-treatment tank 2. The tank 1 includes a drainage pipe 10 to drain treated raw water and an inlet port 11 of the raw water. The aeration tank 1 is provided with a lid 20, so that the inlet port 11 is closed during the operation of the present apparatus.

The air diffuser pipe 8 is provided with air diffusing holes, the size of which is made small such that excessive load is not applied to the air pump 3. In order to produce fine bubbles in the raw water, it may provide the air diffusing holes as much as possible. The air amount to be supplied from the air pump 3 is set such that nonvolatile components can be retained in the liquid phase and only the organic chlorine compounds can be transferred into the air bubbles or gas.

The raw water may be fed into the aeration tank 1 at one time or an appropriate amount may be successively supplied in the aeration tank 1.

In the decomposition-treatment, the organic chlorine compounds collected by the separation-treatment in the tank 1 are supplied to an oxidizing agent-containing treatment solution filled in the decomposition-treatment tank 2, and at the same time, ultraviolet ray is irradiated to the treatment solution to activate the oxidizing agent, to thereby decompose the collected organic chlorine compounds.

The lower portion of the decomposition-treatment tank 2 is provided with an air outlet 12 to receive the gas containing the organic chlorine compounds produced by the separation-treatment. A drainage 13 is provided at the lower portion of the decomposition-tank 2, and an inlet port 14 for supplying the treatment solution and an air-extractor 4 are provided at the upper portion of the decomposition-treatment tank 2. An ultraviolet-ray lamp 6 (herein after referred to "UV lamp 6") housed in a transparent jacket 7 is provided vertically in the decomposition-treatment 2. The UV lamp 6 is connected to a stabilizer 5. During the operation, the inlet port 14 is closed by a lid 21 of the decomposition-treatment tank 2. The stabilizer 5 operates to stabilize the irradiation of the UV lamp 6.

The gas supplied under pressure from the aeration tank 1 is emitted into the treatment solution in the tank 2 through the air outlet 12 in the form of fine bubbles. The bubbles contact the oxidizing agent when the gas rises up in the treatment solution and are irradiated by the UV lamp 6, thereby to oxidation-decompose organic chlorine compounds taken in the bubbles.

The shape of the decomposition-treatment tank 2 may be in a cylinder type or a round type. However, it is effective to use a vertical cylinder type in view of irradiation efficiency of ultraviolet rays from the UV lamp 6 and effective utility of a space in the decomposition-treatment tank 2.

As the UV lamp 6, either a low pressure mercury lamp or high-pressure mercury lamp can be used, but the low pressure mercury lamp is preferable in a viewpoint that ultraviolet rays irradiated from the lamp are adsorbed by hydrogen peroxide or ozone which is used as the oxidizing agent.

As the oxidizing agent used for the decomposition-treatment, it is not especially limited. Judging from an absorption ability of ultraviolet rays (254 nm) irradiated from the low pressure lamp and the difficulty of the after-treatment, hydrogen peroxide or ozone is effective. In a case that ozone ($O_3$) as the oxidizing agent is added to the decomposition-treatment tank, when ultraviolet rays ($h\nu$) is irradiated, $$O_3 + h\nu \rightarrow [O_3 + O_2$$

$$[O_3 + H_2O \rightarrow 2 \cdot OH, \text{ in which } [O] \text{ is oxygen atom.}$$

By this reaction, hydroxyl radical ($\cdot OH$) is prepared. It is considered that this hydroxyl radical affects organic chlorine compounds in the bubbles in the gas sent into the treatment solution from the air outlet 12 to oxidation-decompose the organic chlorine compounds. Namely, the organic chlorine compounds in the gas react with hydroxyl radical in the decomposition-treatment tank 2, and are decomposed to carbon dioxide and chloric acid. Carbon dioxide is ejected from the tank 2 as a gas, and chloric acid remains in the treatment solution in the tank 2. Chloric acid in the tank 2 is neutralized and is disposed. In the invention, hydroxyl radical has no selectivity and is directed to oxidation-decomposition activity for the organic chlorine compounds. When organic substances other than the organic chlorine compounds are contained in the treatment solution, hydroxyl radical is consumed to decompose those organic substances. However, in the present invention, it is arranged that nonvolatile organic substances are maintained in the raw water and only volatile organic chlorine compounds are extracted in the treatment solution. The present invention makes the hydroxyl radical to affect only the organic chlorine compounds extracted from the raw water to remove any cause to inhibit permeability of ultraviolet rays into the treatment solution and any cause to inhibit the activity of hydroxyl radical with respect to the organic chlorine compounds.

According to the present invention, organic chlorine compounds can be easily decomposition-treated without producing harmful industrial wasts in comparison with the conventional methods.

The following is an explanation of the examples of the present invention by using a treatment example of dry cleaning drainage (raw water). In the treatment, a treatment apparatus as shown in FIG. 1 was used. Specification of the treatment apparatus is shown in Table 1 and composites of the dry cleaning drainage (raw water) which was used in the experiment are shown in Table 2.

TABLE 1

| Specification of Treatment Apparatus | | |
|---|---|---|
| Step | Specification | |
| Separation treatment | Volume of aeration tank: | 3.2 l |
| | Material of aeration tank: | stainless steel |
| | Type of air diffuser: | aerator |
| | Material of air diffuser: | glass |
| Decomposition-treatment | Volume of apparatus of oxidation-decomposing tank: | 3.2 l |
| | Material of apparatus of oxidation-decomposing tank: | stainless steel |
| | Material of jacket: | quartz |
| | Type of lamp: | low pressure mercury lamp |
| | Capacity of lamp: | 30 W |

TABLE 2

| Table of composite of dry cleaning drainage (raw water) | |
|---|---|
| Item | Measured value |
| Tetrachloroethylene | 60 mg/l |

TABLE 2-continued

Table of composite of dry cleaning drainage (raw water)

| Item | Measured value |
|---|---|
| Total organic carbons | 6000 mg/l |
| pH | 6.5 |

In the dry cleaning, an object to be washed is treated or cleaned by a dry soap (tetrachloroethylene+surfactant). The dry soap containing dirts and stains after the dry cleaning is distilled and the gas distilled off by this distillation is cooled and liquified. The liquified material is separated by decantation into a solvent and water. The solvent is almost tetrachloroethylene, so that it can be used again. However, water which is separated from the solvent contains a surfactant, stains such as sweat and fatty oils and fats, and tetrachloroethylene. This water is a dry cleaning drainage which is the subject to be treated by the present example.

The dry cleaning drainage (raw water) in the amount of 2.0 l was filled in the aeration tank 1, and 3.0 l of distilled water added with hydrogen peroxide such that the total amount of the hydrogen peroxide in the distilled water is 200 mg/l was poured into the decomposition-treatment tank 2. Thereafter, air was fed into the aeration tank 1 by the air pump 3 at an airflow of 50 l/h to aerate the raw water. On the other hand, at the same time of the operation of the air pump 3, the UV lamp 6 built-in the decomposition-treatment tank 2 was lighted.

Figure 2:
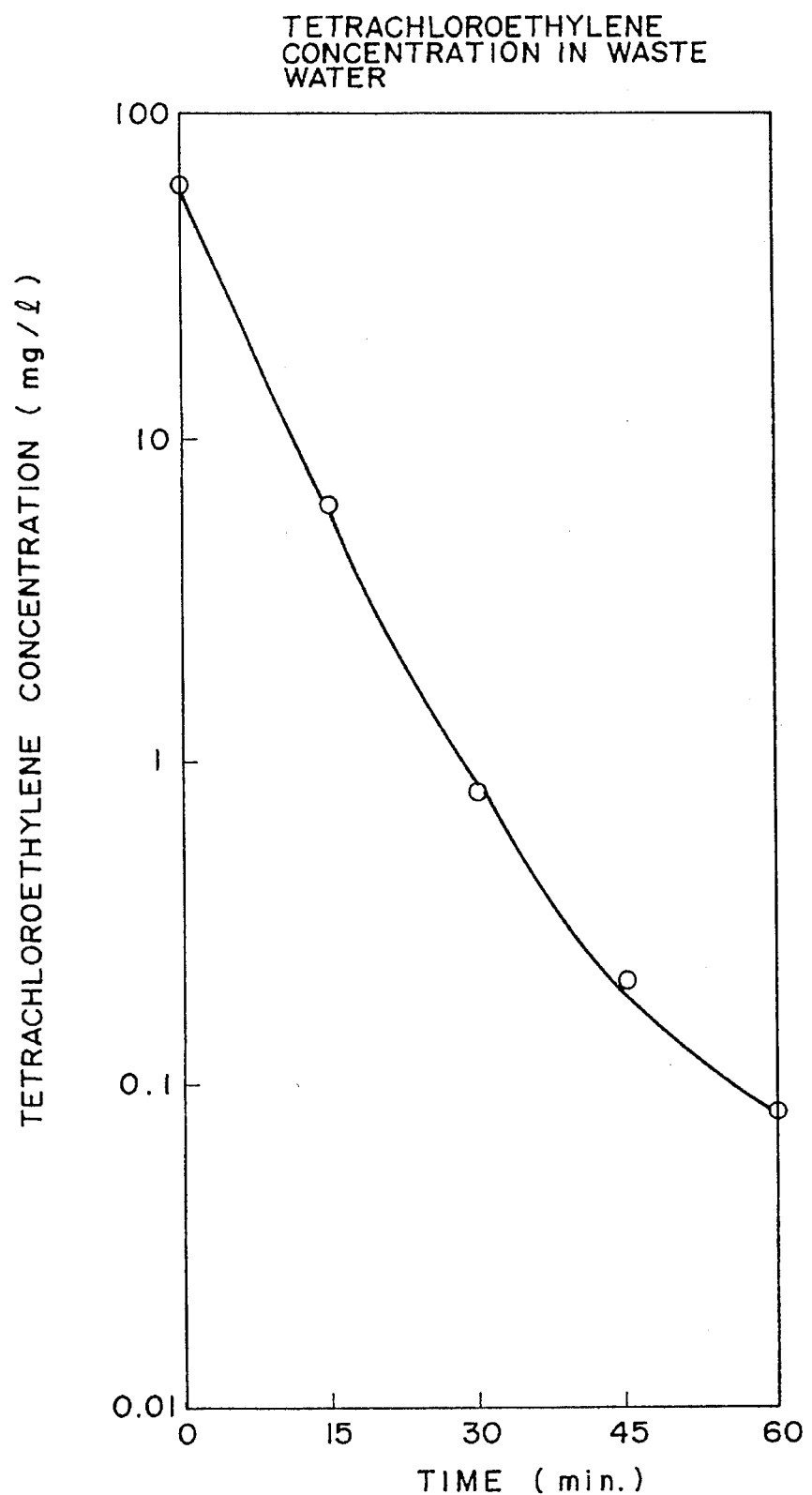
FIG. 2 is a graph showing changes of tetrachloroethylene concentration in drained water with respect to treating time.
Figure 3:
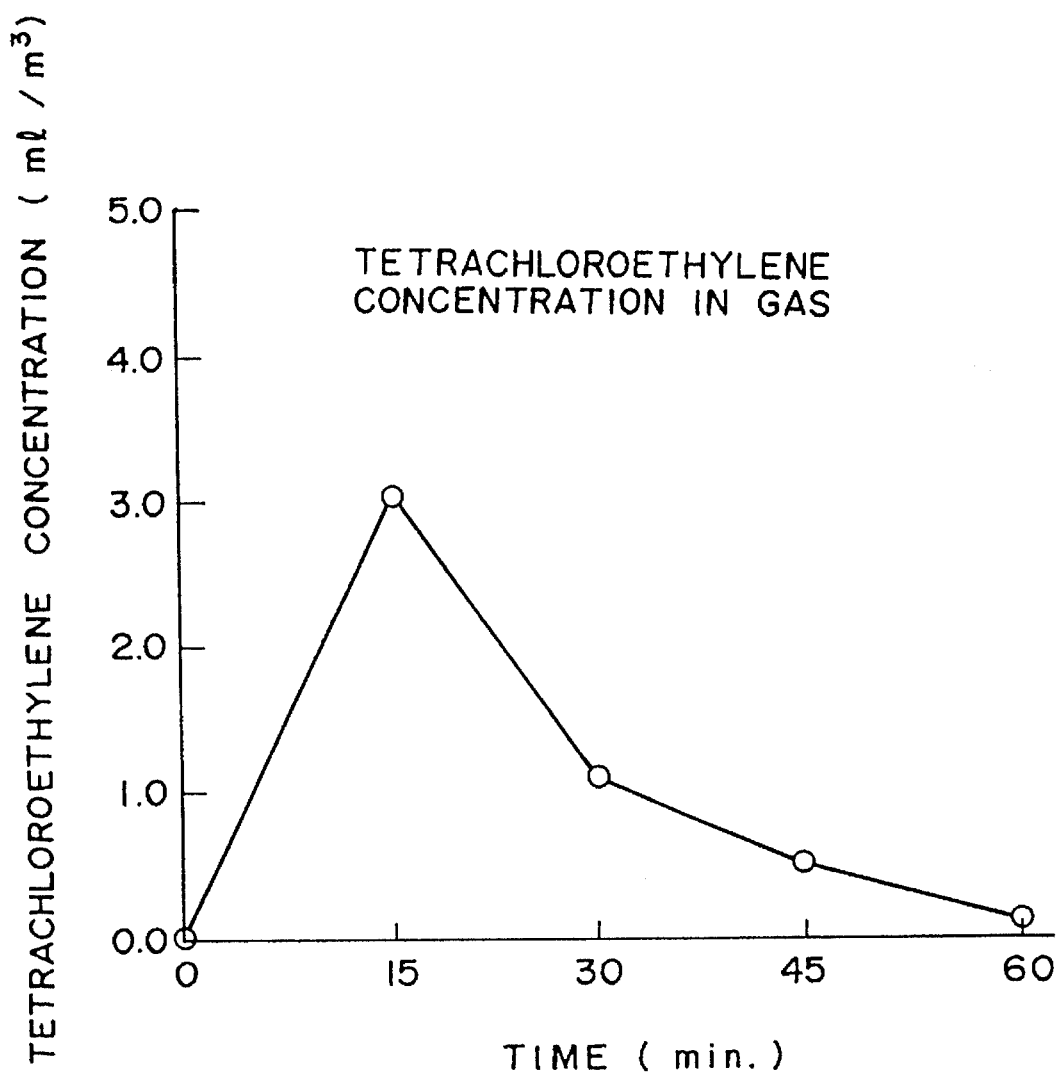
FIG. 3 is a graph showing changes of tetrachloroethylene concentration in gas with respect to treating time.

Tetrachloroethylene concentration in the raw water in the aeration tank 1 was measured every fifteen minutes. The result of this measurement is shown in FIG. 2. Tetrachloroethylene concentration in the gas at an air extracting portion in the decomposition-treatment tank 2 was also measured. The result of this measurement is shown in FIG. 3. Moreover, chloride ion concentration in the hydrogen peroxide-containing water in the decomposition-treatment tank 2 was measured. The result of this measurement is shown in FIG. 4.

As apparent from FIG. 2, tetrachloroethylene concentration in the raw water in the aeration tank 1 was 60 mg/l at the initial-period value; 5 mg/l after fifteen minutes passed; 0.8 mg/l after thirty minutes passed; 0.2 mg/l after fourty five minutes passed; and was lowered to 0.08 mg/l after sixty minutes passed.

As apparent from FIG. 3, tetrachloroethylene concentration in the gas in the air-extractor 4 in the decomposition-treatment tank 2 was 0 ml/m$^3$ at the initial-period value; 3.0 ml/m$^3$ after fifteen minutes passed; 1.1 ml/m$^3$ after thirty minutes passed; 0.5 ml/m$^3$ after fourty five minutes passed; and was changed to 0.1 ml/m$^3$ after sixty minutes passed. Although the gas from the air-extractor 4 contains tetrachloroethylene at the beginning, the content of tetrachloroethylene is reduced as the process proceeds. If necessary, gas from the air-extractor 4 may be re-circulated through the tank 2.

Figure 4:
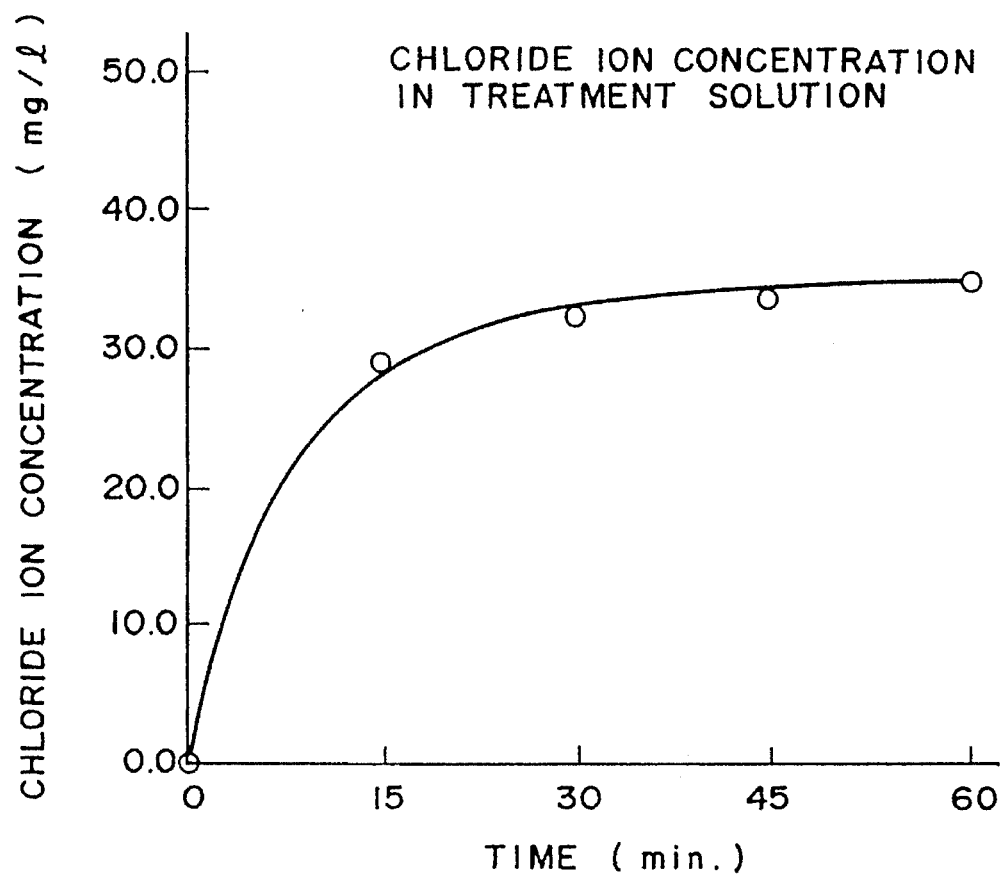
FIG. 4 is a graph showing changes of chloride ion concentration in water containing an oxidizing agent with respect to treating time.

As apparent from FIG. 4, chloride ion concentration in the treatment solution containing hydrogen peroxide in the decomposition-treatment tank 2 was 0 mg/l at the initial-period value; 28.6 mg/l after fifteen minutes passed; 32.0 mg/l after thirty minutes passed; 33.0 mg/l after fourty five minutes passed; and was increased to 34.0 mg/l after sixty minutes passed. If 60 mg/l of the tetrachloroethylene concentration in the raw water in the aeration tank 1 is completely decomposed in the hydrogen peroxide-containing treatment solution. The chloride ion concentration becomes 34.3 mg/l. Since the treatment solution contains 34.0 mg/l, this example proves that tetrachloroethylene in the raw water could be decomposed and removed at 99.1%.

In the above-described example, initial tetrachloroethylene concentration was 60 mg/l. However, the desired effects could be obtained in either of a case of more than 60 mg/l of initial concentration or less than 60 mg/l of initial concentration.

In the above-described example, TOC concentration is 6000 mg/l at the initial period. Even in a case of more or less than 6000 mg/l of concentration at the initial period, the similar effect could be obtained. Furthermore, the present invention is not limited to the dry cleaning drainage, but can be entirely similarly applied to treat underground water, water in river and industrial waste water which contain tetrachloroethylene and other volatile organic chlorine compounds.

According to the present invention, regardless the initial tetrachloroethylene concentration in the raw water or TOC concentration, organic chlorine compounds in the raw water can be transferred from the liquid phase to gaseous phase by the aeration. During the collection of the transferred gaseous organic chlorine compounds in the treatment solution containing oxidizing agent, ultraviolet rays are irradiated to the compounds to thereby completely oxidation-decompose the organic chlorine compounds.

According to the present invention, especially, the decomposition-treatment is conducted by collecting once the organic chlorine compounds of the raw water in the treatment solution. Therefore, even though the raw water contains nonvolatile components such as solid matters, colloidal humic acids, fluvic acids, alcohols, ketones, etc., organic chlorine compounds can be treated such that activation of an oxidizing agent by the irradiation of ultraviolet rays is not inhibited. Thus, the present invention can treat effectively underground water, water in river, industrial drainage and dry cleaning drained liquid.

While the invention has been explained with reference to the specific examples of the invention, the explanation is illustrative and the invention is limited by the appended claims.

What is claimed is:

1. An apparatus for treating a liquid containing organic chlorine compounds comprising, an aeration tank for retaining a liquid containing organic chlorine compounds to be treated, means for supplying a gas into the liquid retained in the aeration tank while aerating so that the organic chlorine compounds contained in the liquid is caught into the gas, a decomposition-treatment tank for retaining a treatment solution containing an oxidizing agent, means for collecting the gas containing the organic chlorine compounds in the aeration tank and providing the gas to the decomposition-treatment tank while aerating to collect the organic chlorine compounds contained in the gas into the treatment solution, and an ultraviolet lamp situated in the decomposition-treatment tank for irradiating ultraviolet rays to the treatment solution to activate the oxidizing agent in the treatment solution so that the oxidizing agent decomposes the organic chlorine compounds in the treatment solution.

2. An apparatus according to claim 1, wherein said means for supplying a gas includes an air pump and an air diffuser pipe with an outlet, said outlet being located at a lower portion of the aeration tank.

3. An apparatus according to claim 1, wherein said means for collecting the gas includes a pipe having an inlet situated at an upper portion of the aeration tank, and an outlet situated at a lower portion of the decomposition-treatment tank.

* * * * *